March 25, 1930.  H. L. WIRT  1,752,047

FOOD SIEVE

Filed April 21, 1927

Inventor:
Harrison L. Wirt,
by Alfred V. Baker
His Attorney.

Patented Mar. 25, 1930

1,752,047

UNITED STATES PATENT OFFICE

HARRISON L. WIRT, OF SCHENECTADY, NEW YORK

FOOD SIEVE

Application filed April 21, 1927. Serial No. 185,540.

In connection with the preparation of foods, and especially the preparation of foods for infants and children, it is required often that the food be forced through a sieve in order to divide it into fine particles and separate out any large or hard pieces, such as the skins and stones of prunes and the stems of spinach, etc.

The ordinary sieve for this purpose is formed of woven wire screen of suitable mesh, the screen being cup-shaped or rounded and supported by a metal loop or some other suitable means. Such a sieve has a number of disadvantages. Owing to its curved contour, it is difficult to force food materials through it with a knife, spoon or other implement. The most advantageous implement is a spoon but this does not work especially well because it is not of the same curvature as the sieve and anyway, it is not possible to operate effectively on the bottom of a round bottomed sieve. Also, as a rule, the wire screen is not strong so that it soon wears out and is yielding so that but little pressure can be applied. In addition, due to the crossing of the wires to form the mesh, there are high spots at each crossing that prevent the spoon or other implement from reaching the lower wires. Due to this fact, the sieve soon becomes clogged with fibrous material that cannot be forced through and that cannot be mechanically removed by the rubbing action of the spoon. Such a sieve is satisfactory as a strainer for liquids but not as a sieve through which more or less solid food is to be forced. Furthermore, a sieve of this type is difficult to clean and keep clean owing to particles of food becoming caught and mechanically held between the wires where they cross to form the mesh due to the weaving or working of the mesh in use.

One object of my present invention is to provide an improved sieve that in its function is half way between a strainer that separates liquids from solids and a grinder that grinds everything that is fed into it, whereby more or less solid food can be forced through it easily and quickly and at the same time undesirable portions can be worked to the side and discarded. A further object is to provide a sieve which is handy to use and which is durable, sanitary and easy to wash and keep clean.

For a consideration of what I believe to be novel and my invention, attention is directed to the following description and the claims appended thereto.

Figure 1:
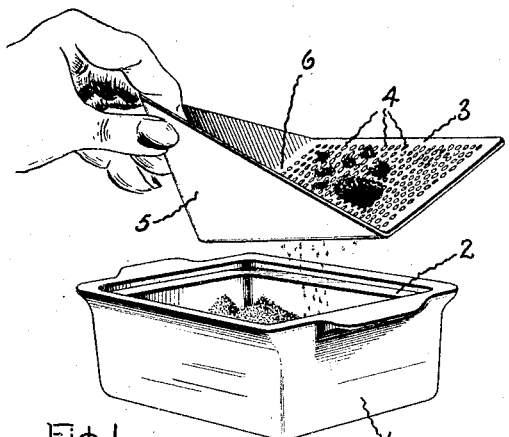
Figure 2:
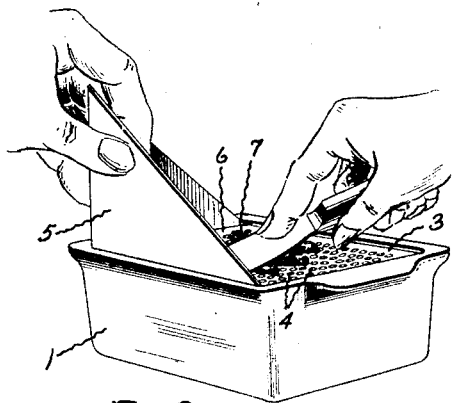
Figure 3:
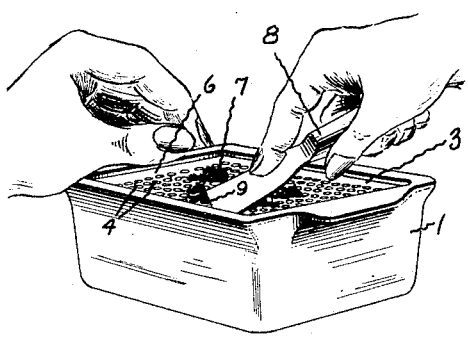
Figure 4:
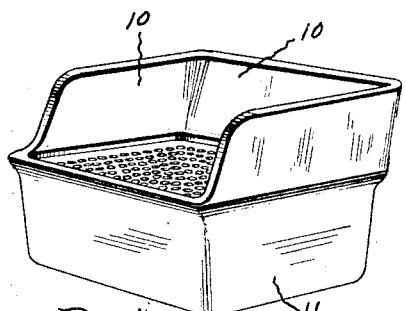
Figure 5:
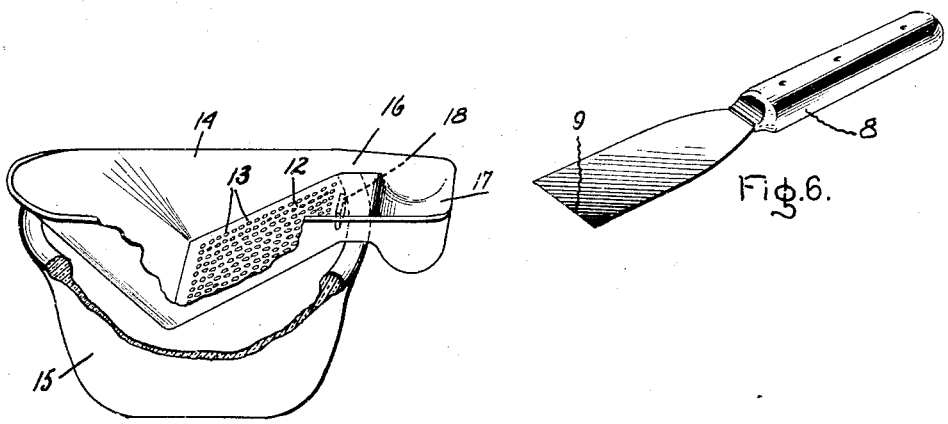
Figure 6:
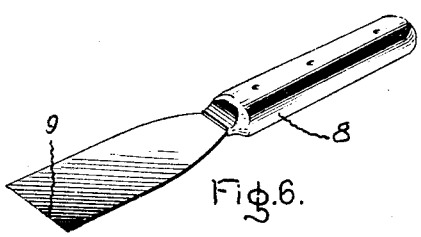

In the drawing, Fig. 1 is a perspective view of a structure embodying my invention; Fig. 2 is a similar view illustrating the manner in which the structure is used; Fig. 3 is a perspective view of a modification; Fig. 4 is a perspective view of another modification; Fig. 5 illustrates another form of the invention and Fig. 6 is a perspective view of an implement used in connection with my invention.

According to the embodiment of the invention shown in Figs. 1 and 2, I provide a receptacle 1 having a supporting ledge 2, the ledge being inside the open top of the receptacle and preferably slightly below the plane of the top. The receptacle may be made of glass or other suitable material. Preferably glass is used as it is easy to keep clean. Adapted to be placed on ledge 2 is a metal plate 3 provided with a large number of small holes 4 punched or otherwise formed therein, the holes being spaced apart suitably to form a sieve. I have found that a suitable sieve is formed by having $\frac{1}{16}''$ diameter holes in metal .043" thick, spaced with their centers $\frac{1}{10}''$ part in rectilinear rows. Plate 3 is made of metal sufficiently thick to make the plate self-supporting. That is to say, the metal is thick enough so that the plate will not bend when food is being forced through it. Preferably the plate is made of a metal such as monel metal, which will not rust. Or, stainless steel may be used with advantage. The holes are made straight preferably and have sharp edges so they will function as a cutting means.

On two sides or three sides of plate 3 I may provide side flanges so as to form a sort of receptacle into which the food may be poured in the first instance, the side flanges being provided with holes or not as found desirable. In Figs. 1 and 2 I have shown triangular shaped flanges 5 on two sides of the plate which serve to form a sort of pocket 6 into which the food material to be forced through the sieve may be placed initially. Such flanges are not required necessarily, however, and in Fig. 3 is shown a construction similar to that of Figs. 1 and 2 except that the side flanges are omitted.

In the use of the invention, the food material is placed on plate 3 as is shown in Figs. 2 and 3 wherein 7 indicates such food material, and it is then forced through the holes by means of an implement 8 having a blade with a straight end edge 9. The implement 8 has a blade tapering in thickness so that a certain amount of flexibility is obtained, and on the other hand enough stiffness so that the edge can be held firmly in engagement with the plate as shown in Figs. 2 and 3. The blade can be made to act in two ways. By flexing it alone, it tends to push the food through the sieve, and by pressing the edge against the sieve and drawing it along the edge, operating in conjunction with the sharp edges of the holes in the sieve, shears off particles that are too big to force through the holes. The most advantageous use of the implement combines the flexing and the shearing actions. In the use of the invention, food material is placed on the plate and operated on by means of the implement 8. This serves to force the food material through the holes in the plate. Since the plate is perfectly flat, edge 9 will be in engagement with it throughout the width of the edge. And since the plate is of relatively heavy material, the implement may be held against the plate with considerable pressure. This makes it an easy matter to quickly work the food material through the holes in the plate, as much pressure as required being used. In operating on the food material, any hard or undesirable particles may be readily pushed to one side. Since the edges of the holes are relatively sharp, they have a shearing action on the food material, tending to cut it into pieces.

I consider the use of a relatively heavy plate 3 which is self-supporting and is provided with holes through which the food material may be forced with a straight-edged implement as being an important feature of my invention.

After the food has been forced through the holes in the plate, the plate may be removed from the receptacle and washed. The plate is easily cleansed as will be obvious since it has no crevices in which food particles can lodge.

The specific construction shown in Figs. 1 and 2 is of particular utility when the food material comprises a mixture of liquid and solids. In this case, the plate may be held by flanges 5 as is shown in Fig. 1 and the food material poured into pocket 6. The liquid will run through the openings into the receptacle and the plate can be then placed on the receptacle as is shown in Fig. 2 and the solids forced through the openings in the plate after the manner already described.

In Fig. 4 is shown a modification wherein flanges 10, similar to the flanges 5 of Figs. 1 and 2, are formed as a part of receptacle 11, the flanges being provided on three sides so as to leave an open side through which the plate is accessible. Otherwise, the arrangement of Fig. 4 is the same as is that of Fig. 2.

In Fig. 5 is shown a modification wherein the plate 12 which is provided with holes 13, is carried in a frame 14 adapted to fit on a variety of receptacles 15, such as a round pan or bowl. The frame provides an open side 16 through which the plate is accessible and at such open side is a trough 17 adapted to catch and retain rejected material. Spaced from trough 17 is a depending stop 18. Plate 12 may be fastened in the frame 14 in any suitable manner, or both may be stamped from one piece of metal. When the structure is placed on the pan as is shown in Fig. 5, trough 17 fits the rim of the pan, and with the stop 18 holds the structure in position.

In connection with each of the constructions it will be noted that there is provided always at least one open side and that the plate is supported sufficiently near to the top edge of the dish or receptacle that through the open side the food material on the plate can be operated on readily with the straight edge of the implement without interference from the side of the dish or receptacle.

From a consideration of the foregoing modifications, it will be seen that by my invention I provide a device for the intended purpose which is simple in structure, easy to use, easy to wash and thoroughly sanitary.

In accordance with the provisions of the patent statutes, I have described the principle of operation of my invention, together with the apparatus which I now consider to represent the best embodiments thereof, but I desire to have it understood that the apparatus shown is only illustrative and that the invention may be carried out by other means.

What I claim as new and desire to secure by Letters Patent of the United States, is:—

1. The combination with a receptacle having a supporting ledge, of a flat self-supporting plate formed from relatively heavy sheet material adapted to be supported by said ledge, said plate having smooth surfaces and being provided with sharp edged holes to form a sieve through which food material may be forced, at least one open side of the plate being in the plane of the top of the receptacle whereby material on the plate may be operated upon with a straight edged tool.

2. A sieve for use with a receptacle upon which it is adapted to be supported, said sieve comprising a flat plate formed from relatively heavy sheet material whereby it is self supporting, said plate having smooth surfaces and being provided with sharp edged holes through which food material may be forced, at least one side of the plate being unobstructed whereby the top surface of the plate is accessible.

3. A sieve for use with a receptacle upon which it is adapted to be supported, said sieve comprising a flat plate formed from relatively heavy sheet material, and flanges on at least two sides of said plate but not more than three sides, said plate having smooth surfaces and being provided with sharp edged openings through which food material may be forced.

4. The combination with a receptacle, of a flat self-supporting plate formed of relatively heavy sheet material adapted to be supported on the receptacle, said plate having smooth surfaces and being provided with sharp edged holes to form a sieve through which food material may be forced, at least one side of the plate being substantially in the plane of the top of the receptacle whereby material on the plate may be operated upon with a straight edged tool, and means providing a trough at one side of the plate.

In witness whereof, I have hereunto set my hand this 20th day of April, 1927.

HARRISON L. WIRT.